July 2, 1963  W. G. JENNINGS  3,095,903

VALVE

Filed May 5, 1960

INVENTOR
William G. Jennings
BY
ATTORNEY

United States Patent Office 3,095,903
Patented July 2, 1963

3,095,903
VALVE
William G. Jennings, Chicago, Ill., assignor to Stewart-Warner Corporation, Chicago, Ill., a corporation of Virginia
Filed May 5, 1960, Ser. No. 27,050
4 Claims. (Cl. 137—625.25)

The present invention relates to valves of the type for delivering high pressure fluid selectively to a plurality of outlets, and more particularly to a valve of this type in which the movable valve means are hydraulically balanced during delivery of high pressure fluid to any one of the fluid outlets or when the high pressure fluid inlet is completely shut off from the fluid outlets.

Valve structures of this type are commercially characterized as four-way manipulator valves including an inlet port, an exhaust port and a pair of outlet ports. The high pressure fluid is normally delivered from the inlet port to one of the outlet ports while the outlet port not in fluid communication with the inlet port is simultaneously connected to the exhaust port. With the valve in an intermediate or neutral position both outlet ports are blocked from fluid communication with the inlet port, but are in fluid communication with the exhaust port and with each other.

Such valve structures in the past were so constructed that in one of the three positions, the valve member was generally hydraulically unbalanced with the high fluid pressure acting to create relatively large pressure drops through the components, resulting in large operation resisting forces, requiring considerable force to move the components from one position to the other.

It is therefore the primary object of this invention to provide a four-way manipulator-type valve in which the movable elements are hydraulically balanced in all operative positions including the neutral position.

It is a further object of this invention to provide a four-way manipulator valve having three operable positions in which the minimum force is required for moving the valve to any one of the three positions.

It is a further object of this invention to provide a four-way manipulator-type valve in which the means for moving the valve in contact with the fluid are exposed only to negligible exhaust pressure.

Further objects of this invention will be pointed out in the following detailed description and claims and illustrated in the accompanying drawings which disclose, by way of example, the principle of this invention and the best mode which has been contemplated of applying that principle.

Figure 2:
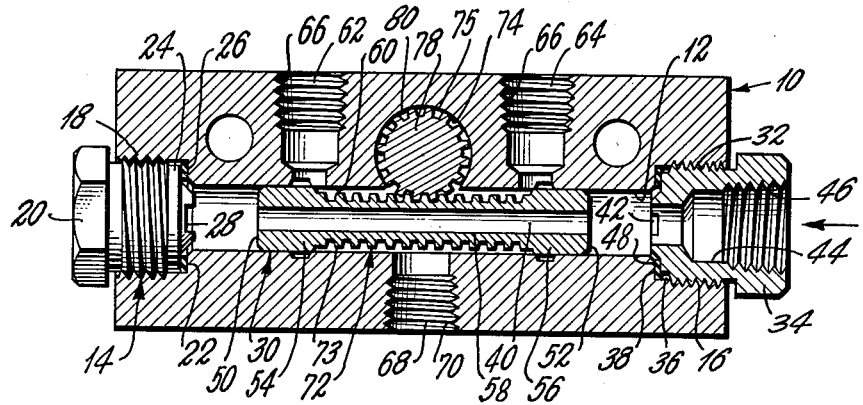
Figure 1:
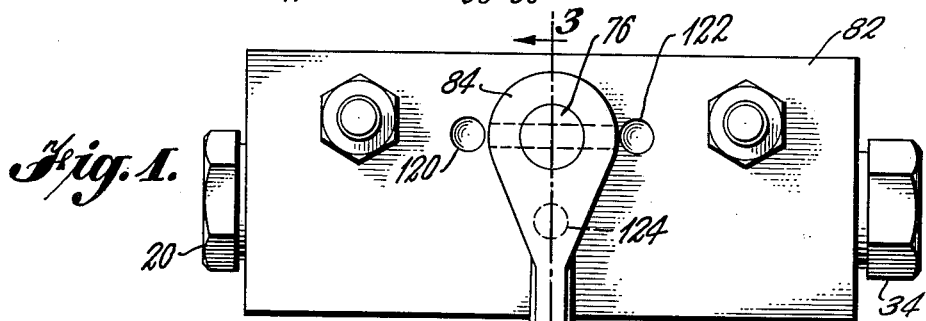
Figure 3:
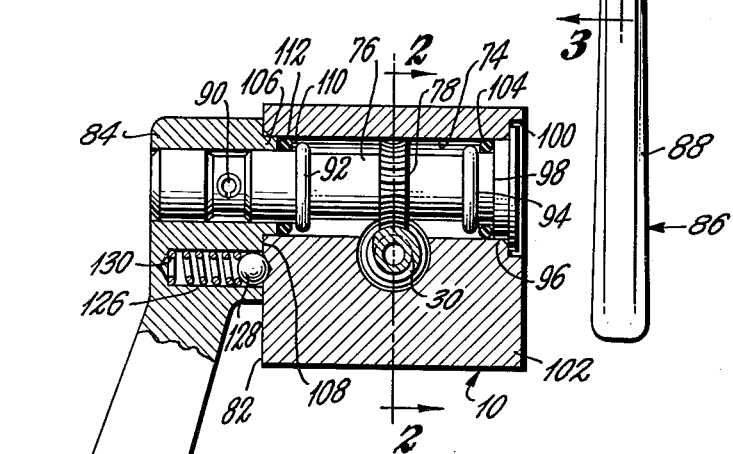

In the drawings:
FIGURE 1 is a top plan view of one embodiment of this invention including a hand operated lever for operating the valve;
FIGURE 2 is a top sectional view of the structure shown in FIGURE 1; and
FIGURE 3 is a side elevational view, partially in section, of the embodiment shown in FIGURES 1 and 2.

In general, the apparatus of this invention comprises a valve body including an elongated bore, with one end of the bore being open and forming a fluid inlet. A piston is slideably positioned in the bore in sealing relation therewith. The piston includes a central aperture extending the full length thereof for directing inlet fluid to either end of the bore. A pair of transverse, spaced fluid outlets are formed within the valve body and connected to the bore. Means are provided for moving the piston axially between two extreme positions, whereby in one extreme position, the fluid inlet is in communication with one of the fluid outlets and the other of the fluid outlets is completely sealed from said inlet while in the other extreme position, the fluid outlet which was in communication with the fluid inlet is now sealed off from the inlet and the other fluid outlet is in communication therewith. The piston may include an intermediate, reduced diameter portion with an exhaust opening being formed transversely of the valve body intermediate of the fluid outlets, whereby, when the piston is in one of its extreme positions, the fluid outlet which is blocked from fluid communication with the fluid inlet is in direct fluid communication with the exhaust opening through the intermediate fluid cavity formed between the piston and the bore.

In one embodiment of this invention the intermediate reduced diameter portion of the piston has formed thereon a circular rack which meshes with a rotatable spur gear mounted on a shaft, the shaft extending outwardly from the valve body and a hand operated lever is rigidly attached to the shaft for moving the piston axially within the bore between the two extreme positions.

Referring to the drawing, the four-way manipulator valve of the present invention includes an elongated, rectangular housing or valve body 10 which may be formed of cast metal construction or the like. An elongated central bore 12 runs the full length of the valve body 10 with the inclusion of enlarged bore sections 14 and 16 on either end of bore 12. The left-hand, enlarged bore section 14 is threaded as at 18 and receives a solid metallic screw 20 which acts to compress an annular sealing member 22 between the face 24 or head of the screw 20 and the shoulder 26 formed at the inner end of the enlarged bore 14. In this manner, the left-hand end of bore 12 is completely sealed from the outside. The forward portion or face of the plug or screw 20 includes a transversely extending groove or channel 28 which insures delivery of high pressure fluid to the full end face 50 of the piston member 30 which is positioned within the elongated bore 12.

In like manner, the right-hand end of valve body 10 has its enlarged bore section 16 threaded at 32 and is adapted to receive a hollow bushing 34 of metal or other suitable material with the inner face 36 of the bushing compressing an annular sealing member 38 against shoulder 40 formed at the inner end of the enlarged bore section 16. The bushing 34 includes a transverse groove or slot 42 extending fully across the contact surface or face 48 of this member which is used as a means for distributing the high pressure fluid against the right-hand end face 52 of piston member 30. The hollow bushing is provided with a suitable internal bore 44 which is threaded at 46 to receive a fluid carrying conduit (not shown) with the bushing 34 acting as the fluid inlet terminal.

Positioned within bore 12 is an elongated piston member 30 which includes a central bore 40 running the complete length of the piston and adapted to deliver high pressure inlet fluid from bushing 34 to either end of bore 12, thus subjecting both end faces 50 and 52 of the piston member to equal fluid pressure providing a hydraulically balanced valve member. Piston member 30 is of a diameter approximately equal to the internal diameter of bore 12 such that the piston member is in sealing relation with the bore. However, intermediate of end portions 54 and 56 of piston 30, there is provided a reduced diameter section 58 which acts to form a fluid cavity 60 between end portions 54 and 56 of the piston and bore 12.

The valve body includes a pair of transverse fluid outlets or openings 62 and 64 which are spaced some distance from each other and extend from bore 12 to the outer surface of the valve body 10. The outlets are threaded at 66 and are coupled to outlet conduits (not shown) for delivering the high pressure fluid shown from inlet 34 to desired locations. Centrally of the fluid outlets 62 and 64, there is provided a third transversely extending fluid opening or exhaust passage 68 which extends from bore 12 to the outer surface of valve body 10. In like manner to the other fluid openings, the exhaust is threaded at 70 and acts to receive in threaded engagement, a suitable exhaust conduit (not shown). The physical dimensions of the piston member 30 are such that the ends 54 and 56 of the piston extend beyond the fluid outlets 62 and 64 with the lands 54 and 56 acting to completely seal the outlet from one or more portions of the valve depending upon the position of the piston with respect to the bore 12. In this regard, the piston 30 is slidably positioned within bore 12 with the lands 54 and 56 acting to seal the ends of the bore from the intermediate cavity 60 which is at all times in direct communication with the exhaust opening 68. The piston 30 is free to slide axially within the bore 12 but the extent of such axial movement is limited by screw 20 on one end of the bore and bushing 34 on the other end.

In order to control the position of valve member 30 within valve body 10, the reduced diameter portion 58 of valve piston 30 is provided with circular rack teeth 72 which are formed on the outer peripheral surface of the piston along the intermediate reduced diameter section. A suitable transverse bore 74 extends vertically through valve body 10 at right angles to the elongated bore 12 and in fluid communication therewith. A shaft 76 is positioned within bore 74 and has rigidly coupled thereto, a spur gear 78, with the teeth 80 of the spur gear in mesh with teeth 73 of rack 72. Rotation of spur gear 78 results in longitudinal movement of piston 30 within bore 12 from one extreme position where face 50 contacts screw 20 to the other extreme position where face 52 of piston 30 contacts bushing 34.

The shaft 76 extends outwardly from bore 74 past the upper surface 82 of valve body 10. The protruding portion of shaft 76 receives an enlarged head 84 of lever 86 which in this case is adapted to be moved manually to vary the position of piston 30 within bore 12. In order to provide a grasping surface, an elongated arm portion 88 extends away from the axis of shaft 76 at right angles thereto. Suitable means are provided for rigidly connecting the lever 86 to shaft 76, which may comprise a laterally extending pin 90 passing through a rounded head portion 84 and shaft 76.

Since the cavity or chamber 74 holding spur gear 78 is in fluid communication with the intermediate cavity 60 and exhaust opening 68, suitable sealing means are provided for sealing this cavity or chamber within valve body 10. Shaft 76 includes a pair of spaced, generally rounded shoulders 92 and 94 positioned some distance on either side of spur gear 78, the shoulders being of a diameter somewhat greater than the diameter of shaft 76 but less than the diameter of bore 74. The terminal end of shaft 76 remote from lever 86 terminates in a pair of enlarged diameter sections 96 and 98, the diameter of section 96 being approximately the same as that of bore 74 with the diameter of section 98 being somewhat larger but slightly less than the diameter of enlarged bore section 100 formed within the valve body 10 adjacent the bottom surface 102 of the rectangular block-shaped valve body 10. Between the rounded shoulder 94 and the large diameter section 96, there is provided an O-ring 104 or other appropriate sealing means which acts to prevent egress of pressurized fluid past annular flange sections 96 and 98. At the upper end of shaft 76 a similar sealing arrangement is provided. The enlarged forward section 84 of lever 86 is provided with an annular, depending flange portion 106, having an inner diameter equal to the diameter of shaft 76 which it tightly receives, and an outer diameter equal to the diameter of bore 74. The effect of depending flange 106 is to form a contact surface or face 108 which seats against a portion of the upper surface 82 of valve body 10 with the flange 106 and annular shoulder 92 of shaft 76 forming an O-ring receiving cavity 110 which tightly embraces an O-ring 112 at the upper end of spur gear receiving cavity 74.

In this manner, a highly efficient means is provided for causing the piston 30 to move axially within bore 12 while at the same time effectively preventing the escape of pressurized fluid from within the valve body by way of the valve actuating mechanism. It is important to note that cavity 74 receiving the spur gear and shaft 76 is in direct communication with the intermediate fluid cavity 60 and is also in fluid communication with exhaust passage 68. In this regard, the present invention makes advantageous use of the fact that at no time is the valve actuator means including the gear train subjected to high pressure fluid but only the relatively low pressure of the exhaust line 68. In this respect, along with the fact that the valve body or piston 30 is at all times in fluid equilibrium, there is relatively little power required to initiate movement of the manually operable handle or lever 86 in the preferred embodiment or of various power driven means if a power operated valve is desired in order to move the piston member from either of its extreme positions or from any position intermediate thereof.

It is also apparent, that the physical dimensions of the valve structure are such that the lands 54 and 56 of piston 30 extend beyond the ends of the fluid outlets 62 and 64 and that the outlets are never in direct communication with each other at a time when one of the outlets is in fluid communication with the high pressure inlet fluid. FIGURE 2 shows the valve piston 30 in its intermediate position with the outlets 62 and 64 in fluid communication with each other by way of intermediate fluid cavity 60 and in fluid communication with exhaust opening 68. If the operating means such as lever 86 is moved to the right, in the particular embodiment shown here, the spur gear is caused to rotate in a counterclockwise direction which will result in movement of piston 30 to the right within bore 12. In this position, the high pressure fluid entering inlet 34 will pass through the elongated bore 40 to the opposite end of the bore and fluid inlet will be in fluid communication with outlet 62 to deliver high pressure fluid to this outlet. At the same time, the high pressure fluid on both face 50 and 52 of piston 30 will act to retain piston member 30 in fluid equilibrium. While the diameter of lands 54 and 56 is only slightly less than the internal diameter of bore 12, there will be a small amount of leakage of high pressure fluid past these surfaces. However, since high pressure fluid is directed on either end of bore 12, leakage will occur in both directions from faces 50 and 52 towards the low pressure intermediate cavity 60 with any fluid leaking past these surfaces, being directed to exhaust opening 68. Thus, with the piston 30 in this extreme position, the piston 30 will be in fluid equilibrium with equal high pressure leakage in both directions toward the central exhaust opening 68. Should it be desirous to move the piston 30 to a new position in order to change the communication of the fluid inlet to the other fluid outlet, there will be little resistance to movement of piston 30 since the mechanism is in fluid equilibrium, and since the chamber containing the gear train is subjected only to the low pressure fluid outlet.

With the piston 30 at the right-hand end of bore 12, the outlet 62 is cut off from outlet 64 but fluid outlet 64 is in direct communication with the intermediate fluid cavity 60 and exhaust opening 68. Thus, fluid may drain through outlet 64 into the exhaust cavity along with any fluid escaping between lands 54 and 56 and bore 12.

If actuator lever 86 is now rotated in a clockwise direction to the point where it assumes position indicated in FIGURE 1, the piston 30 will have moved to the left to a neutral position between either extreme position and in effect prevents the high pressure fluid which enters inlet 34 from reaching either outlet 62 or 64. The high pressure fluid within bore 12 passes through the elongated central conduit 40 of piston member 30 allowing the high pressure fluid to be directed against both face 50 and 52 to achieve fluid equilibrium conditions on the piston 30, but high pressure fluid is prevented from discharging through either outlet 62 or 64. At the same time, the fluid outlets 62 and 64 are now in direct fluid communication with intermediate fluid cavity 60 and both of these chambers may drain into the exhaust opening 68. The valve member 30 is also in fluid equilibrium since substantially equal leakage occurs between lands 54 and 56 and bore 12 from the high pressure areas to the relatively low pressure of intermediate fluid pressure cavity 60 and exhaust opening 68. Because of this fluid equilibrium, little force will be required to move the valve from this intermediate position to either extreme position.

If actuator lever 86 is now rotated further in a clockwise direction, the piston member 30 will continue to move to the left until its forward face 50 seats against the screw 20. In this extreme position, high pressure fluid entering inlet 34 passes directly to outlet 64 while at the same time the high pressure fluid is in fluid communication with the left-hand face 50 of piston 30 to again insure that the piston member 30 is in fluid equilibrium. It can be seen that grooves 28 and 42 act to insure that the faces 50 and 52 of piston 30 receive the high presssure fluid to insure fluid equilibrium when the piston is in either of its extreme positions. At the same time, with piston 30 moved to its extreme left position, the outlet 62 will be cut off from fluid outlet 64 but will be in direct fluid communication with intermediate fluid cavity 60 and exhaust opening 68. Again, any high pressure fluid leaking past lands 54 and 56 will effect equal high pressure fluid leakage in opposite directions and such leakage will enter outlet 68, along with any discharge from outlet 62.

While the valve is so designed that when positioned in any desired position, it will remain so until physically moved, means are provided for insuring that the valve member will remain in either of its extreme or neutral positions. A series of detents or circular grooves are formed in the upper face 82 of valve body 10. The detent 120 is positioned on the left side of shaft 76 in line with the longitudinal axis of the valve bore 12, with detent 122 in line with detent 120 but positioned on the right side of the shaft 76. A detent 124 is positioned intermediate of the first two detents at right angles to the plane of these two detents and spaced the same radial distance from the axis of shaft 76.

A bore 126 is formed within contact face 108 of the operating lever 86, with the bore extending parallel to the axis of the shaft 76 but being somewhat less in length that the height of the handle at this point. A small metallic ball 128 having a diameter slightly less than bore 126 is positioned within bore 126 and is spring biased by means of compression spring 130 against the surface 82 of valve body 10, with the arc of contact of ball member including the three detents 120, 122 and 124. It is therefore apparent that movement of the actuator lever 86 to either of its extreme positions or to its intermediate neutral position will result in seating of ball 128 within the detent grooves 120 through 122 and 124. Thus, the actuator lever may be frictionally locked in any of the three positions.

The improved four-way manipulator valve provides a valve structure in which the valve may be positioned in any one of three positions with considerably less power than that required to initiate movement of devices in the past. At the same time, the valve remains hydraulically balanced in all of the three desired positions with leakage greatly reduced even when the valve is in either of its two flow delivery positions, while at the same time providing the advantageous feature of having the actuating means subjected only to the relatively low exhaust pressure. With this type of arrangement, no elaborate sealing means are necessary and the use of simplified O-rings results in a valve body which is completely sealed regardless of the position of the movable valve means.

In addition, with valve structures of the conventional type, a condition frequently occurs in which the spool, when in an idle position, settles towards one side of the adjacent wall displacing the oil film and causing seizure of the valve of the valve body. Because of the uniform, continuous leakage appearing at both ends of the piston in the construction of the present valve structure, and because of the action of the spur gear in directing its force on the ratchet teeth at the pressure angle of the gears, the present improved valve has no tendency to seize. This, in addition to the hydraulically balanced condition of the valve in both the extreme and intermediate positions results in a valve structure requiring little operating force to initiate movement from one desired position to another.

While there has been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. A valve, comprising a valve body having an elongated bore, abutments at opposite ends of the bore, a piston matably disposed in the bore and having a through-bore terminating at opposed end surfaces of equal areas projected normal to the longitudinal axis of the bore, said piston being axially translatable within the bore between two extreme positions whereat a portion of the end surface of said piston is in contact with its adjacent abutment, each abutment and end surface constituted and arranged in said extreme positions to define with said bore an annular cavity, means for providing fluid communication between each defined annular cavity and the through-bore of the piston, said valve body having a fluid inlet communicating with the bore and the through-bore, said valve body also having a pair of axially spaced fluid outlets communicating with the bore between the abutments, each of said outlets being spaced from its adjacent abutment and its remote abutment respectively, a distance less than and greater than the length of the piston, and means for translating the piston within the bore.

2. A valve, comprising a valve body having an elongated bore, central abutments at opposite ends of the bore each having a recess therein, one of the abutments having a fluid inlet communicating with the recess, a piston matably disposed in said bore and having an axial through-bore aligned with the recess, the opposite ends of the piston having fluid exposed surfaces of equal area projected normal to the longitudinal axis of the bore, said valve body having a pair of axially spaced fluid outlets communicating with the bore between the abutments, each of the outlets being spaced from its adjacent abutment and its remote abutment respectively, a distance less than and greater than the length of the piston, means on said piston ends forming an annular cavity between the respective abutments and end surfaces of said piston in the extreme positions, and means for translating the piston to extreme positions within the bore to directly abut a portion of the end surface with its adjacent abutment, with the remaining portion of said end surface being exposed to said recess and said annular cavity communicating therewith.

3. A valve, comprising a valve body having a cylindrical bore, central abutments at opposite ends of said bore each having a diametrical recess therein, one of said abutments having a fluid inlet communicating with the recess, a cylindrical piston disposed in said bore with limited fluid leakage therebetween and having a central axial through-bore aligned with the recesses, the opposite ends of the piston projected normal to the longitudinal axis of the bore having fluid exposed surfaces of equal area, said valve body having a pair of axially spaced fluid outlets communicating with the bore between abutments, each of said outlets being spaced from its adjacent abutment and its remote abutment respectively, a distance less than and greater than the length of the piston, means including said end surfaces and said abutment forming an annular cavity adjacent the periphery of said bore, and means for translating the piston within the bore to extreme positions whereat a portion of the end surface abuts its adjacent abutment, the remaining portion of the end surface being exposed to the recess and to said annular cavity in communication with the recess, said translating means including a circular rack formed on the piston intermediate its ends and a pinion rotatably supported by the valve body intermediate the outlets and engaging the rack.

4. A valve, comprising a valve body having an elongated bore, abutments at opposite ends of the bore, a piston matably disposed in the bore with limited fluid leakage therebetween, said piston having a through-bore terminating at opposed end surfaces of equal projected areas normal to the longitudinal axis of the bore, said piston being axially translatable within the bore between two extreme positions whereat a portion of the end surface is in contact with its adjacent abutment, the remaining portion of the end surface being non-abutted and forming with said abutment an annular cavity adjacent the periphery thereof, means approximate the abutted portion of each end surface and its abutment for communicating the through-bore with the annular cavity, said valve body having a fluid inlet communicating with the bore and the through-bore, said valve body also having a pair of axially spaced fluid outlets communicating with the bore between the abutments, each of the outlets being spaced from its adjacent abutment and its remote abutment respectively, a distance less than and greater than the length of the piston and means for translating the piston within the bore.

References Cited in the file of this patent
UNITED STATES PATENTS

| | | |
|---|---|---|
| 629,857 | Hoerr | Aug. 1, 1899 |
| 1,908,396 | Albright | May 9, 1933 |
| 2,360,430 | Lear | Oct. 17, 1944 |
| 2,628,809 | Mikeska | Feb. 17, 1953 |
| 2,648,352 | Rappl | Aug. 11, 1953 |